(12) United States Patent
Patoux et al.

(10) Patent No.: US 8,652,431 B2
(45) Date of Patent: Feb. 18, 2014

(54) METAL FLUOROPHOSPHATE SYNTHESIS AND USE AS AN ACTIVE MATERIAL FOR A BATTERY ELECTRODE

(75) Inventors: Sébastien Patoux, Fontaine (FR); Carole Bourbon, Saint-Michel de Saint-Geoirs (FR); Erwan Dumont-Botto, Toulouse (FR); Mickael Dolle, Toulouse (FR); Patrick Rozier, Toulouse (FR)

(73) Assignees: Commissariat a l'Energie Atomique et aux Energies Alternatives, Paris (FR); Centre Nationale de Recherche Scientifique, Paris (FR)

(*) Notice: Subject to any disclaimer, the term of this patent is extended or adjusted under 35 U.S.C. 154(b) by 17 days.

(21) Appl. No.: 13/509,075

(22) PCT Filed: Nov. 4, 2010

(86) PCT No.: PCT/FR2010/000735
§ 371 (c)(1),
(2), (4) Date: Jul. 3, 2012

(87) PCT Pub. No.: WO2011/058239
PCT Pub. Date: May 19, 2011

(65) Prior Publication Data
US 2012/0279850 A1   Nov. 8, 2012

(30) Foreign Application Priority Data

Nov. 10, 2009 (FR) ...................................... 09 05405

(51) Int. Cl.
*C01B 25/45* (2006.01)
*C01B 25/455* (2006.01)
*H01M 4/04* (2006.01)
*H01M 4/13* (2010.01)

(52) U.S. Cl.
USPC ..... 423/301; 423/306; 429/218.1; 429/231.9; 429/231.95

(58) Field of Classification Search
USPC ........ 423/301, 306; 429/218.1, 231.9, 231.95
See application file for complete search history.

(56) References Cited

U.S. PATENT DOCUMENTS

2002/0168573 A1* 11/2002 Baker et al. .............. 429/231.95
2002/0192553 A1   12/2002 Barker et al.
(Continued)

FOREIGN PATENT DOCUMENTS

| EP | 0 992 468 A1 | 4/2000 |
|---|---|---|
| EP | 1 574 477 A2 | 9/2005 |
| WO | WO 2008/037765 A2 | 4/2008 |

OTHER PUBLICATIONS

Recham et al., "Ionothermal Synthesis of Li-Based Fluorophosphates Electrodes," *Chemistry of Materials*, vol. 22, 2010, pp. 1142-1148.

(Continued)

*Primary Examiner* — Timothy Vanoy
(74) *Attorney, Agent, or Firm* — Oliff PLC

(57) ABSTRACT

A method of synthesis of a metal fluorophosphate having the following general formula (1): $X_a M_b (PO_4)_c F_d$ (1), in which: X is an alkaline metal selected among sodium (Na) and lithium (Li) or a mixture of said metals; M is a transition metal selected among the following elements: Co, Ni, Fe, Mn, V, Cu, Ti, Al, Cr, Mo, Nb or a combination of at least two of said metals, $0 \leq a \leq 5$; $0.5 \leq b \leq 3$; $0.5 \leq c \leq 3$; and d is an integer equal to 1, 2 or 3. The method contains an electric-field-activated sintering process for a mixture (1) formed by at least one first phosphate-containing solid precursor and at least one second fluorine-containing solid precursor.

16 Claims, 6 Drawing Sheets

(56) References Cited

U.S. PATENT DOCUMENTS

2008/0153002 A1* 6/2008 Nazar et al. .................. 429/221
2010/0028676 A1 2/2010 Patoux et al.
2013/0069012 A1* 3/2013 Kim et al. .................... 252/506

OTHER PUBLICATIONS

Chang et al., "Spark Plasma Sintering of Al Substituted $LiHf_2(PO_4)_3$ Solid Electrolytes," *Solid State Ionics*, vol. 176, 2005, pp. 2583-2587.

Kobayashi et al., "Densification of $LiTi_2(PO_4)_3$- Based Solid Electrolytes by Spark-Plasma-Sintering," *Journal of Power Sources*, vol. 81/82, 1999, pp. 853-858.

Lee et al., "Spark Plasma Sintering (SPS) of NASICON Ceramics," *J. Am. Ceram. Soc.*, vol. 87, No. 2, 2004, pp. 305-307.

Chang et al., "Spark Plasma Sintering of $LiTi_2(PO_4)_3$-Based Solid Electrolytes," *J. Am. Ceram. Soc.*, vol. 88, No. 7, 2005, pp. 1803-1807.

Wen et al., "Preparation, Microstructure and Electrical Properties of $Li_{1.4}Al_{0.4}Ti_{1.6}(PO_4)_3$ Nanoceramics," *J. Electroceram*, vol. 22, 2009, pp. 342-345.

Okada et al., "Fluoride Phosphate $Li_2CoPO_4F$ as a High-Voltage Cathode in Li-ion Batteries," *Journal of Power Sources*, vol. 146, 2005, pp. 565-569.

\* cited by examiner

METAL FLUOROPHOSPHATE SYNTHESIS AND USE AS AN ACTIVE MATERIAL FOR A BATTERY ELECTRODE

TECHNICAL FIELD OF THE INVENTION

The invention relates to a method of synthesis of a metal fluorophosphate having the following general formula (1):

$$X_a M_b (PO_4)_c F_d \qquad (1)$$

in which:

X is an alkaline metal selected among sodium (Na) and lithium (Li) or a mixture of said metals;

M is a transition metal selected among the following elements: Co, Ni, Fe, Mn, V, Cu, Ti, Al, Cr, Mo, Nb or a combination of at least two of said metals, $0 \leq a \leq 5$; $0.5 \leq b \leq 3$; $0.5 \leq c \leq 3$; and d is an integer equal to 1, 2 or 3, X, M, $PO_4$, F, a, b, c, d being chosen in order to maintain the electroneutrality of the metal fluorophosphate.

STATE OF THE ART

Since the appearance of lithium batteries, several generations of materials for positive electrodes have successively appeared.

The active compounds for electrodes used in the current batteries on the market are, for positive electrodes, lamellate compounds such as $LiCoO_2$, $LiNiO_2$ and the mixed compounds Li(Ni, Co, Mn, Al)$O_2$ or compounds having a spinel structure whose composition is close to $LiMn_2O_4$. Negative electrodes are generally made of carbon (graphite, coke, ... ) or possibly of spinel $Li_4Ti_5O_{12}$ or of a metal forming an alloy with lithium (Sn, Si, ... ). The theoretical and practical specific capacities of the mentioned compounds for positive electrodes are approximately 275 mAh·$g^{-1}$ and 140 mAh·$g^{-1}$ for oxides with a lamellar structure ($LiCoO_2$ and $LiNiO_2$) and 148 mAh·$g^{-1}$ and 120 mAh·$g^{-1}$ for the spinel $LiMn_2O_4$, respectively. In all the cases, for positive electrodes, an operating voltage relative to metal lithium close to 4 Volts is obtained.

For a few years, materials with three-dimensional structures built from polyanionic entities of $XO_n^{m-}$ type, with X=P, S, Mo, W ..., have caused a real passion in the field of batteries in particular of lithium batteries and, more particularly, orthophosphates with an olivine structure and having the general formula $LiMPO_4$, with M=Fe, Mn, Co, Ni. The most studied material is lithium-containing iron phosphate, $LiFePO_4$, whose interest in terms of stability, security and cost has made of it a material which is strongly interesting for electric and solar automobile applications.

The document US-A-2010028676 mentions for example a method of synthesis of orthophosphates $LiMPO_4$ at a low temperature, allowing to obtain improved practical results compared to anterior art.

Recent studies on metal fluorophosphates aroused an interest for their promising theoretical capacities as active materials for lithium-battery electrodes and also, for sodium-battery electrodes.

In addition, fluorine offers the advantage of extending the choice of electrode materials by proposing new compounds and new structures. In addition, fluorine is a very electronegative element (it has a tendency to attract electrons) which can create, in certain cases, a considerable inductive effect and thus increase the redox potential of the transition element at work.

These batteries containing metal fluorophosphates are able to fulfill the requirements in terms of mass energy in the field of autonomous supply.

Some of these metal fluorophosphates are promising candidates for a use as an active material for lithium-ion- or sodium-ion-battery electrodes. Among them, the metal fluorophosphates having the following general formula (1) are particularly promising:

$$X_a M_b (PO_4)_c F_d \qquad (1)$$

in which:

X is an alkaline metal selected among sodium (Na) and lithium (Li) or a mixture of said metals;

M is a transition metal selected among the following elements: Co, Ni, Fe, Mn, V, Cu, Ti, Al, Cr, Mo, Nb or a combination of at least two of said metals, $0 \leq a \leq 5$; $0.5 \leq b \leq 3$; $0.5 \leq c \leq 3$; and d is an integer equal to 1, 2 or 3.

Nevertheless, at present, the synthesis of these metal fluorophosphates proves to be difficult and gives poor results in particular because of the volatile nature of the fluorinated compounds. Indeed, the conventional methods of synthesis of metal fluorophosphates consist in mixing the fluorophosphate precursors in the form of a powder and to heat them, generally in a furnace, in order to cause the precursors to react with one another, This synthesis by solid process is tiresome and requires an extended heat treatment, causing important losses of fluorinated compounds, due to a loss of fluorine when bringing the fluorinated precursor in contact with ambient moisture, and has a poor yield.

As an example, the document US-A-20020192553 discloses a method of synthesis of an active material for sodium-battery electrodes having the formula $Li_{1-z}Na_zMPO_4F$ in which $0<z<1$ and M is a transition metal selected among V, Mn, Fe, Co, Cu, Ni, Ti or a mixture thereof. The sodium fluorophosphate is obtained from a powder of metal phosphate oxide and of a lithium or sodium fluoride, by heating it until the reaction between the two precursors occurs. For example, a mixed sodium and vanadium fluorophosphate (NaVPO$_4$F) is synthesized from a mixture of vanadium phosphate VPO$_4$ and of sodium fluoride (NaF). The homogeneous mixture, transferred into a tubular furnace, is submitted to a heat treatment by rising the temperature at a rate of 2° C.min$^{-1}$ up to 750° C., then it is maintained at this temperature during 1 hour.

In the article "Fluoride phosphate $Li_2CoPO_4F$ as a high-voltage cathode in Li-ion batteries" (Journal of Power Sources, 146 (2005) p.565-569), S. Okada and al. describe a method of synthesis of a mixed cobalt and lithium fluorophosphate prepared in several steps from a lithium and cobalt phosphate and a lithium fluoride. It is noted that the last step of the synthesis is laborious and avid for energy since it requires a 78-hour treatment at 780° C. in a vacuum quartz tube.

In the article "Ionothermal Synthesis of Li-Based Fluorophosphates electrodes" (Chemistry of Materials, American Chemical Society, vol.22, (2009/04/11), p. 1142-1148), Reckham and al. propose an alternative by describing the synthesis of fluorophosphates by ionothermic liquid process i.e. by using precursors in a solvated form and at a low temperature.

OBJECT OF THE INVENTION

The object of the invention is a method of synthesis of a metal fluorophosphate easy to implement, allowing to obtain a great number of fluorophosphates compounds with a high yield.

The object of the invention is also a method of synthesis of a metal fluorophosphate that can be industrially produced.

According to the invention, this object is reached in that it includes a heat treatment of a mixture of solid precursors of said metal fluorophosphate, formed by at least one first phosphate-containing precursor and at least one second fluorine-containing precursor and in that the heat treatment is an electric-field-activated sintering process during which it is applied to said mixture, simultaneously, a pressure between 0.5 MPa and 200 MPa and an electrical current heating said mixture with a mean temperature rising rate between 50° C./min$^{-1}$ and 600° C./min$^{-1}$.

The object of the invention is also the use of a metal fluorophosphate obtained by this method of synthesis as an active material for a battery electrode, in particular, for lithium-ion or sodium-ion batteries.

BRIEF DESCRIPTION OF THE DRAWINGS

Other advantages and characteristics will more clearly arise from the following description of specific embodiments of the invention given as nonrestrictive examples and represented in the annexed drawings, in which.

DESCRIPTION OF SPECIFIC EMBODIMENTS

Figure 1:
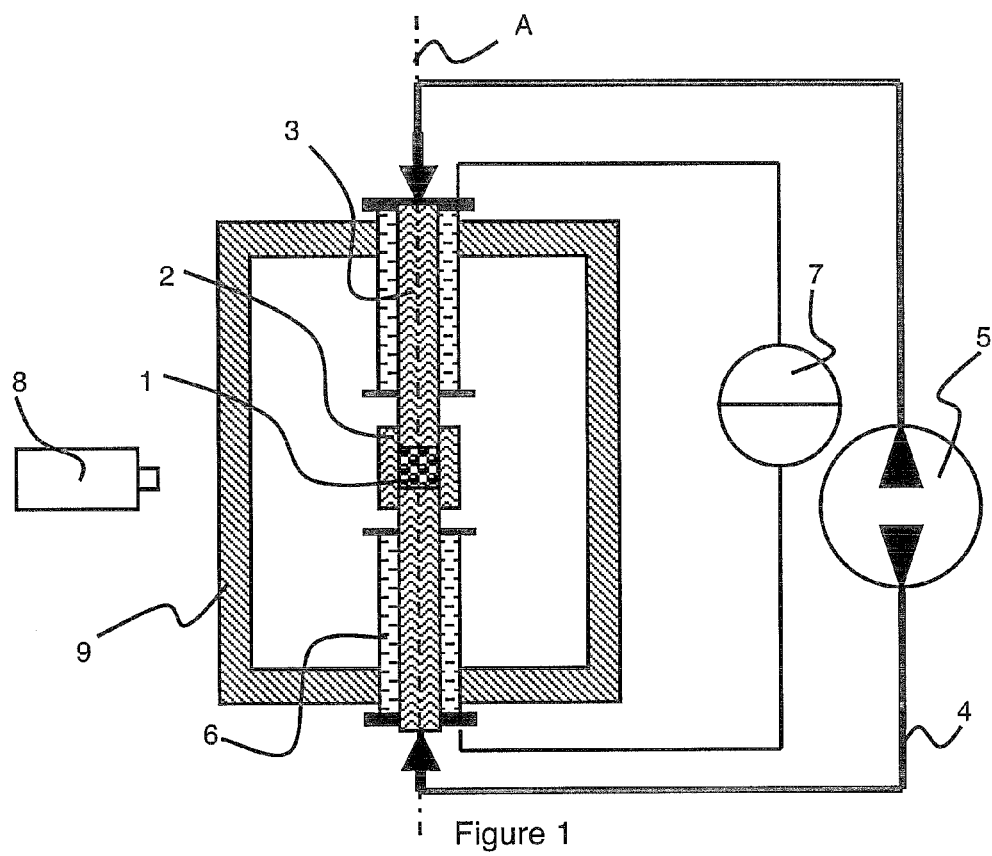
FIG. 1 represents, schematically and in a sectional view, an electric-field-activated sintering device.

According to a specific embodiment, a metal fluorophosphate is synthesized by causing the reaction between at least two solid precursors of the metal fluorophosphate which are first put in the form of a mixture of powders and are then submitted to a heat treatment carried out by an electric-field-activated sintering process.

The metal Fluorophosphate has the following general formula (1):

$$X_aM_b(PO_4)_cF_d \quad (1)$$

in which;

X is an alkaline metal selected among sodium (Na) and lithium (Li) or a mixture of said metals;

M is a transition metal selected among the following elements: Co, Ni, Fe, Mn, V, Cu, Ti, Al, Cr, Mo, Nb or a combination of at least two of said metals, 0≤a≤5; 0.5≤b≤3; 0.5≤c≤3; and d is an integer equal to 1, 2 or 3, X, M, PO$_4$, F, a, b, c, d being chosen in order to maintain the electroneutrality of the metal fluorophosphate.

According to a preferential embodiment, the metal fluorophosphate is a metal fluorophosphate having the following general formula (2):

$$X_2M'PO_4F \quad (2)$$

in which

M' is a transition metal selected among Co, Ni, Fe, V, Mn, Cu, Ti, Al, Cr, Mo, Nb, and X is an alkaline metal selected among Na and Li or a mixture of said metals.

The method of synthesis is particularly advantageous for a mixed cobalt metal fluorophosphate, preferably, selected among Li$_2$CoPO$_4$F and Na$_2$CoPO$_4$F.

The mixture of solid precursors of the metal fluorophosphate is formed by at least one first phosphate-containing precursor and at least one second fluorine-containing precursor.

The first phosphate-containing precursor is advantageously selected among a metal phosphate, a sodium phosphate and an ammonium phosphate.

The metal phosphate is advantageously selected among VPO$_4$, AlPO$_4$, FePO$_4$, MnPO$_4$, TiPO$_4$, CrPO$_4$, Co$_3$(PO$_4$)$_2$, Li$_3$PO$_4$, LiFePO$_4$, LiCoPO$_4$, NaCoPO$_4$, LiMnPO$_4$, LiNiPO$_4$, LiVPO$_4$, LiTi$_2$(PO$_4$)$_3$, Li$_2$TiFe(PO$_4$)$_3$, NaTi$_2$(PO$_4$)$_3$, Na$_2$TiFe(PO$_4$)$_3$, Na$_3$V$_2$(PO$_4$)$_3$, Li$_3$V$_2$(PO$_4$)$_3$, Li$_3$Cr$_2$(PO$_4$)$_3$, Na$_3$Cr$_2$(PO$_4$)$_3$, and their hydrates. As a nonrestrictive example, the hydrate can be of hydrated MnPO$_4$ or hydrated FePO$_4$.

The ammonium phosphate is preferably selected among NH$_4$H$_2$PO$_4$, (NH$_4$)$_2$HPO$_4$, NaNH$_4$HPO$_4$ and their hydrates.

The sodium phosphate can be, for example, NaH$_2$PO$_4$ and its hydrates.

The second fluorine-containing precursor is a metal fluoride selected in a preferential way among alkaline metal fluorides, advantageously selected among NaF and LiF. Alternatively, the metal fluoride is selected among ammonium fluoride NH$_4$F and transition-metal fluorides, in particular, selected among MnF$_2$, CoF$_2$, NiF$_2$, TiF$_2$, FeF$_2$, hydrated FeF$_2$ and CrF$_3$.

The mixture of precursors can also contain a third precursor selected among a metallic oxide MO, a metal hydroxide M(OH)$_2$, a metal acetate M(CH$_3$COO)$_2$, a metal carbonate MCO$_3$, a metal nitrate M(NO$_3$)$_3$, a metal sulfate MSO$_4$, a metal oxalate MC$_2$O$_4$ and a metal oxohydroxide MO(OH), M being a metal preferably selected among a transition metal or an alkaline metal.

Preferably, the third precursor is selected among FeO, MnO, NiO, CoO, MnO$_2$, Li$_2$CO$_3$, TiO$_2$, Cr$_2$O$_3$, V$_2$O$_3$, V$_2$O$_5$, Fe$_2$O$_3$, Mn$_2$O$_3$, Fe$_3$O$_4$, Mn$_3$O$_4$, Ni$_3$O$_4$, Co$_3$O$_4$, Al(OH)$_3$, Al$_2$O$_3$, Na$_2$CO$_3$, FeC$_2$O$_5$, NH$_4$VO$_3$, Cr(NO$_3$)$_3$, P$_2$O$_5$ and their hydrates.

By definition, sintering process is a method of hot pressing of a powder to obtain a material. The powder is heated in a furnace at a temperature lower than the melting point of the material until the powder particles adhere to one another, thus ensuring the cohesion of the material. When several powders are used, the sintering process ensures the adherence of the various materials together.

An electric-field-activated sintering process also known as the acronym FAST ("Field Activated Sintering Technique") or SPS ("Spark Sintering Plasma") technique or "flash" sintering is a conventional technique of shaping material, similar to the conventional hot pressing. However, this last technique is different by a external heating source contrary to the SPS technique. This technique of shaping material powders is generally used to quickly obtain dense materials with fine microstructure whatever metals, ceramics, polymers or composites.

As represented in FIG. 1, when implementing this electric-field-activated sintering technique, the powders 1 are introduced into a pressing matrix 2. A pressure and a continuous, continuous-pulsated, or alternating electrical current are simultaneously applied during the sintering process. Traditionally, the pressing matrix 2 has an annular shape and is delimited by a cylindrical surface closed at the upper and lower bases (respectively at the top and at the bottom in FIG. 1) by two pistons 3 made of the same material as the pressing matrix 2. The powder 1 is placed into the space delimited by the pressing matrix 2 and the two pistons 3. In a general way, this space is hermetically closed. The pistons 3 are connected via a hydraulic circuit 4 to a hydraulic press 5. The pistons 3 are generally symmetrical and positioned on both sides of the pressing matrix 2 in order to be able to exert a uniaxial pressure on the powder placed in the pressing matrix 2. The current can be applied via at least two electrodes 6 connected to a current generator 7. The current flows through the conductive pressing matrix 2 and can even flow, in appropriate cases, through the powder sample 1. The pressing matrix 2 thus operates as a heating source, which makes it possible to obtain high temperature rising rates. The temperature is classically measured by an optical or infra-red pyrometer 8 arranged near the pressing matrix 2 (FIG. 1). The pressing matrix 2 is located in a chamber 9 including cooling means (not represented), classically water circulation means, to allow the cooling of the pressing matrix 2 after the heat treatment.

This technique is known to form a high density material from precursors introduced in the form of a powder, by limiting the reaction between the precursors and by minimizing the inter-diffusion of the elements constituting the precursors within the material. As the temperature rising rate is high and the residence times at high temperature are relatively short, the densification of the material is not, or very little, accompanied by a crystal growth.

According to a specific embodiment, a method of synthesis of a metal fluorophosphate includes a heat treatment of a mixture of solid precursors 1 of said metal fluorophosphate. The mixture 1 is formed by at least one first phosphate-containing precursor and at least one second fluorine-containing precursor.

The mixture of precursors 1 must preferably be homogeneous and is classically obtained by manual or automatic crushing for a length of time between 2 minutes and 60 minutes.

The mixture of precursors 1 is then placed into the pressing matrix 2. The pressing matrix 2 is made of a material which is inert relative to the precursors and is electrically conductive, preferably made of carbon graphite. The pressing matrix 2 has classically a cylindrical shape with a diameter advantageously between 8 mm to 300 mm, inside which the pistons 3 can slide (FIG. 1).

As represented in FIG. 1, the pressing matrix 2 is then arranged in the chamber 9 between the two pistons 3 which close the pressing matrix 2.

According to a preferential embodiment, the chamber 9 is then depressurized, preferably, at a pressure between $10^{-2}$ Pa to 10 Pa.

According to an alternative, the chamber 9 is maintained under the atmospheric pressure during the method. In this case, the chamber 9 is submitted to a not-oxidizing atmosphere, for example, neutral or slightly reducing gas like argon, helium or nitrogen. Indeed, during heating, the oxygen in the air can cause a deterioration of the pressing matrix 2 with the formation of carbon dioxide ($CO_2$).

The mixture of precursors 1 is then submitted to a heat treatment. In particular, the heat treatment is an electric-field-activated sintering process io during which it is applied to the mixture of precursors 1, simultaneously, a pressure between 0.5 MPa and 200 MPa and an electrical current heating the mixture 1 with a mean temperature rising rate between 50° C./min$^{-1}$ and 600° C./min$^{-1}$.

According to a preferential embodiment, the electric-field-activated sintering process applied to the mixture of precursors (1) includes successively a rise in pressure up to a pressure between 0.5 MPa and 200 MPa, preferably between 10M Pa and 50M Pa. The pressure is reached in less than 600 seconds, preferably in less than 120 seconds. The pressure is exerted via the pistons 3 connected to the hydraulic press 5 and is maintained all along of the heat treatment.

The pressure is applied to the mixture of precursors 1, preferably, in an uniaxial way, according to the axis A (FIG. 1).

The electric-field-activated sintering process includes then a rise in temperature up to a temperature between 300° C. and 1000° C., preferably between 550° C. and 750° C. The temperature is, advantageously, lower than the melting point of the product of reaction. This fast rise in temperature is carried out, preferably, by generating a pulsated current with a strong intensity.

The pulsated current can be applied in the form of a sequence of electrical current pulses, with at least one period without any current therebetween, each pulse being applied over a period advantageously between 1 to 10 ms.

The mixture of precursors 1 is advantageously submitted to a pulsated current with an intensity between 100 A and 50 000 A, preferably between 300 A and 2000 A.

The temperature can advantageously be reached in less than 20 minutes, the pressure being maintained all along the rise in temperature.

According to another specific embodiment, during the electric-field-activated sintering process, the rise in temperature can include several temperature ramps. Each temperature ramp corresponds to a temperature rising rate between 50° C./min$^{-1}$ and 600° C./min$^{-1}$.

Once the temperature is reached, the pressing matrix 2 is immediately cooled thanks to the cooling means for the chamber 9, at a cooling rate advantageously between 10° C./min$^{-1}$ and 600° C./min$^{-1}$.

According to an alternative, the cooling process can be carried out after a temperature plateau advantageously of a short length of time, preferably lower than 30 minutes.

In the same way, a temperature plateau can also be present after a temperature ramp. The rise in temperature then consists of several temperature ramps and one or more plateaus. Nevertheless, each temperature plateau has preferentially a short length of time, in particular, a length of time lower than 10 minutes.

Advantageously, the electric-field-activated sintering step has a length of time lower than or equal to 30 minutes and/or the total length of time of the method of synthesis, including the initial mixture, does not exceed 1 hour, preferably does not exceed 30 minutes.

At the end of the method of synthesis, it is noted in a surprising way that the precursors in the mixture 1 have reacted with one another to form the corresponding metal fluorophosphate. Thus, the electric-field-activated sintering process, instead of densifying the initial mixture of precursor powders 1 and implementing a conventional shaping process, causes a chemical reaction between the species present in the mixture of precursors 1 to form a new compound, in the case in point the metal fluorophosphate. In other words, in a completely unexpected way, a synthesis is carried out during this method at the same time as the shaping process for the mixture of precursors 1. It is obtained a metal fluorophosphate in a densified form, which could be pulverized later according to any known method.

The synthesis of the metal fluorophosphate is carried out according to known reaction diagrams. One can nevertheless distinguish several conventional ways of synthesis, the synthesis by reaction of a metal phosphate with a metal fluoride according to the following general reaction (3):

$$X_{a-1}M_b(PO_4)_c + XF_d \Pi X_aM_b(PO_4)_cF_d \quad (3)$$

in which M, X, a, b, c and d are such as previously defined in the general formula (1).

As a nonrestrictive example, the lithium and vanadium fluorophosphate (X=Li; M=V; a=1; c=1; d=1 in the formula (3)) is obtained from a vanadium phosphate as first precursor and from a lithium fluoride as second precursor according to the following reaction (4):

$$LiF + VPO_4 \Pi LiVPO_4F \quad (4)$$

If in the formula (3) a=0, the metal fluorophosphate is free of X. With M=Co; a=0; b=2; c=1; d=1 in the formula (3), it can be obtained for example a cobalt fluorophosphate from cobalt phosphate and cobalt fluoride according to the following reaction (5):

$$CoF_2 + Co_3(PO_4)_2 \Pi 2(Co_2PO_4F) \quad (5)$$

According to another example, with X=Li or Na; M=Co; a=2; b=1; c=1; d=1 in the formula (3), it can be obtained a cobalt and lithium (or sodium) fluorophosphate from cobalt and lithium (or sodium) phosphate and from lithium (or sodium) fluoride according to the following reactions (6) and (7):

$$LiF + Li CoPO_4 \Pi Li_2CoPO_4F \quad (6)$$

$$NaF + NaCoPO_4 \Pi Na_2CoPO_4F \quad (7)$$

Another synthesis reaction diagram consists in causing a third precursor to react with the first precursor and the second precursor. The third precursor will preferentially be selected among the precursors that cause no or few gas releases during the heat treatment.

As an example, the synthesis of a lithium and vanadium fluorophosphate can be carried out from ammonium dihydrogen phosphate (ADHP), from vanadium oxide and from lithium fluoride according to the following reactions (8) and (9):

$$NH_4H_2PO_4 + 0.5V_2O_3 \Pi VPO_4 + NH_3 + 1.5H_2O \quad (8)$$

$$LiF + VPO_4 \Pi LiVPO_4F \quad (9)$$

The reactions (8) and (9) can be advantageously implemented during the electric-field-activated sintering process in the method of synthesis. The method of synthesis of the metal fluorophosphate advantageously includes a single step of electric-field-activated sintering process during which the reactions (8) and (9) are carried out. The implementation of the method of synthesis is identical to that described above and successively includes the crushing of ammonium dihydrogen phosphate (ADHP), of lithium fluoride and of vanadium oxide corresponding respectively to the first, second and third precursors, to form a mixture of precursors 1 then the placement of the mixture of precursors 1 into the pressing matrix 2 followed by the electric-field-activated sintering process as previously described.

It can be mentioned, as an example, the synthesis of sodium and cobalt fluorophosphate from ammonium hydrogen phosphate (ADHP) as first precursor, from sodium fluoride as second precursor and from sodium carbonate and cobalt carbonate as third precursors according to the following reactions (10) and (11):

$$0.5Na_2CO_3 + CoCO_3 + (NH_4)_2HPO_4 \Pi NaCoPO_4 + 2NH_3 + 1.5CO_2 + 1.5H_2O \quad (10)$$

$$NaF + NaCoPO_4 \Pi Na_2CoPO_4F \quad (11)$$

According to another specific embodiment, the method of synthesis of metal fluorophosphate includes a preliminary synthesis step for the metal phosphate from at least one ammonium or sodium phosphate and at least one metal oxide, one metal hydroxide or one metal carbonate. The ammonium phosphate is preferably chosen among $NH_4H_2PO_4$, $(NH_4)_2HPO_4$ and $NaNH_4HPO_4$ and their hydrates. The sodium phosphate can be, for example, $NaH_2PO_4$ or its hydrates. Thus, the first precursor introduced into the mixture of precursors 1 can come from a preliminary synthesis of metal phosphate.

The preliminary synthesis step for the metal phosphate can be an electric-field-activated sintering process carried out under conditions similar to those for the above-described metal fluorophosphate. According to a specific embodiment, the method of synthesis can successively include a first electric-field-activated sintering process to form the metal phosphate then a second electric-field-activated sintering process to form the metal fluorophosphate.

For syntheses producing gas releases (reactions 8 to 11), the gas products will be advantageously evacuated by any known method.

EXAMPLE 1

0.279g of lithium cobalt phosphate $LiCoPO_4$ and 0.045 g of lithium fluoride LiF are mixed manually in an agate mortar for 20 minutes. This mixture 1 is then placed into a pressing matrix 2 of carbon graphite 2333 having a diameter of 8mm, protected by Papyex (marketed by "Société Carbone Lorraine") and closed by two symmetrical pistons 3 made of the same material as the pressing matrix 2. This matrix 2 is then introduced, at the ambient temperature, into the chamber 9 of a SPS (Spark Plasma Sintering) machine which is under a high vacuum or secondary vacuum (between $1.10^{-2}$ Pa and 6 Pa). The synthesis is then carried out by applying two ramps, a pressure ramp and a temperature ramp. A pressure of 25 MPa is reached in one minute and is maintained during the remainder of the method of synthesis. A temperature of 600° C. is reached in 2 steps: a first temperature ramp at a temperature rising rate of 100° C.min$^{-1}$ for 5 minutes then a second temperature ramp at a temperature rising ramp of 50° C.min$^{-1}$ for 2 min. These first and second temperature ramps are obtained by applying pulsated currents defined over 14 periods of 3.3 ms, i.e. 12 periods of pulsated current and 2 periods of non-pulsated current. The pressing matrix 2 is then cooled within the chamber 9 of the SPS machine. A pellet is thus obtained, polished on an abrasive paper and then mixed manually in a mortar. It is obtained a homogeneous powder of $Li_2CoPO_4F$ with a weight purity of 96% and a yield of 91%.

Figure 2:
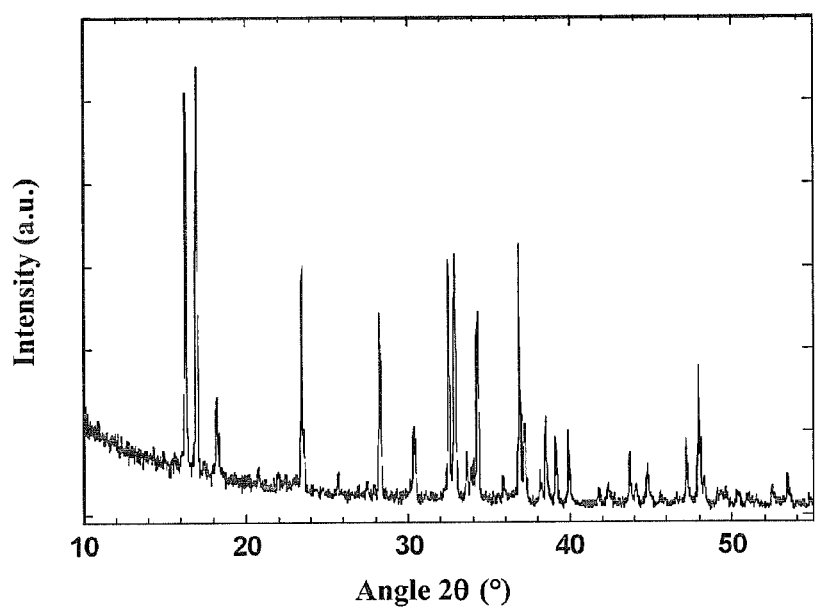
FIG. 2 is a graph representing the x-ray-diffraction diagram ($\lambda_{Cu}K_\alpha$) for a mixed cobalt and lithium fluorophosphate having the formula Li$_2$CoPO$_4$F and synthesized according to a specific embodiment of the invention.
Figure 3:
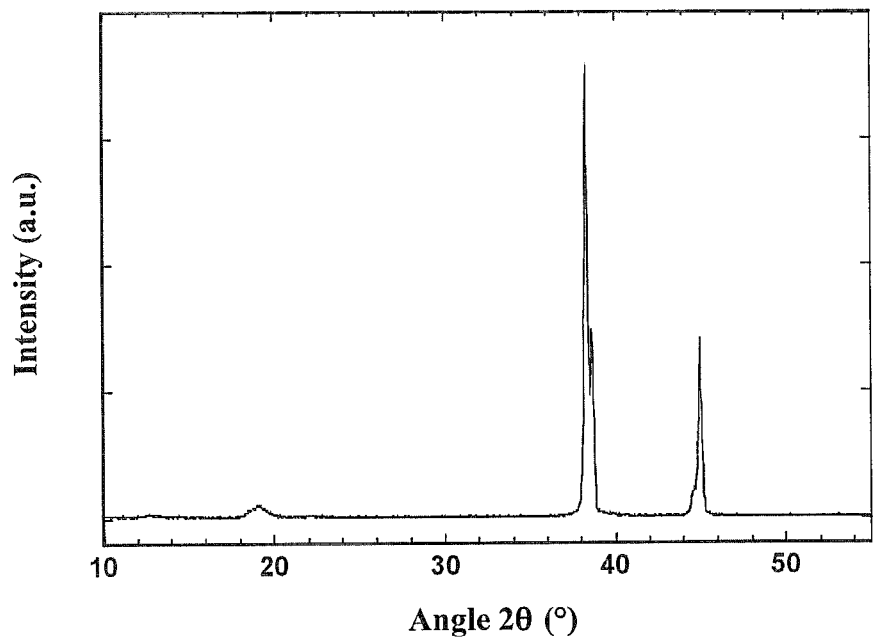
FIGS. 3 and 4 are graphs representing the x-ray-diffraction diagrams ($\lambda_{Cu}K_\alpha$), respectively, for lithium fluoride (LiF) and for mixed cobalt and lithium phosphate having the formula LiCoPO$_4$.
Figure 4:
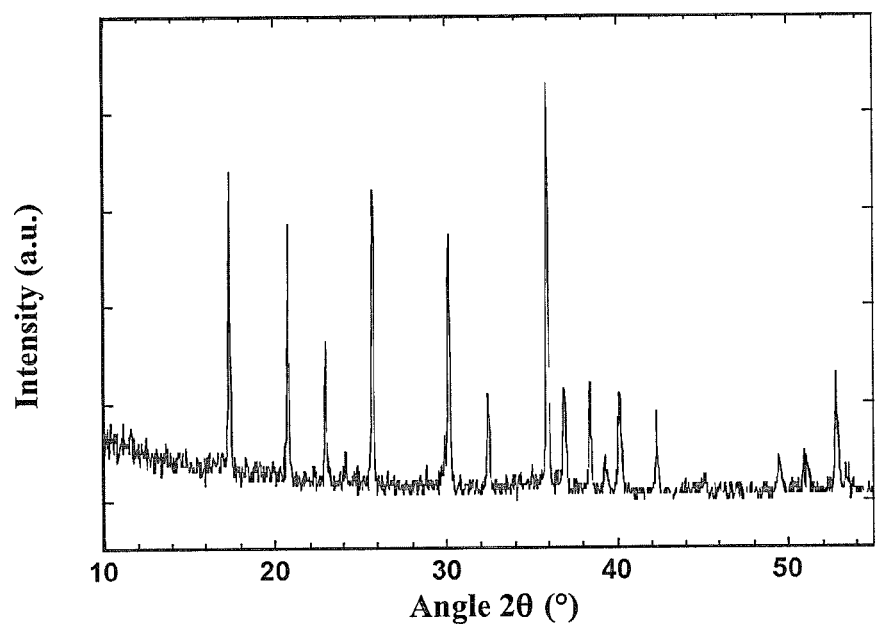

The x-ray diffractogram of the powder thus obtained is represented in FIG. 2. It is noted that the peaks of diffraction correspond to the peaks characteristic of the lithium and cobalt fluorophosphate. FIGS. 3 and 4 correspond to the diagrams of X-rays diffraction of the precursors, respectively lithium fluoride and lithium and cobalt phosphate. By comparing the peaks of diffraction characteristic of said powder with those of the precursors, lithium fluoride and lithium and cobalt phosphate, it is noted that the product resulting from this method of synthesis has a different molecular structure. During the method of synthesis and in particular during the electric-field-activated sintering process, the precursors were actually transformed into $Li_2CoPO_4F$ and not only shaped.

Figure 5:
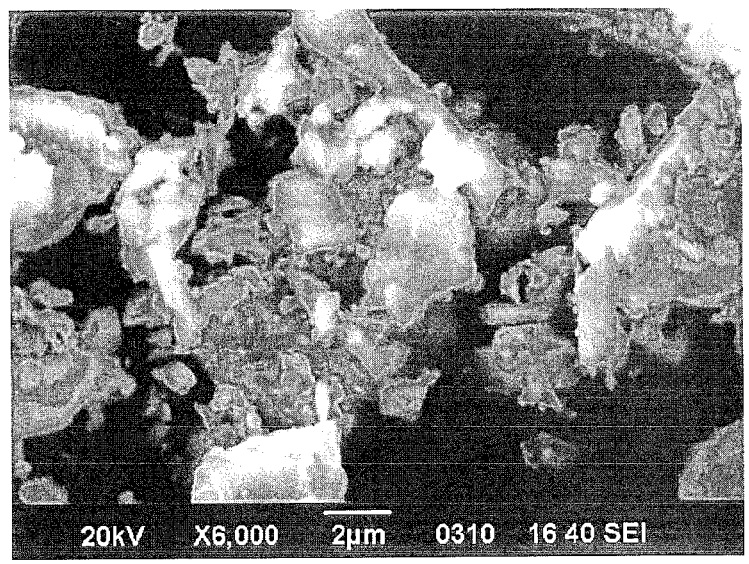
FIG. 5 represents a photo, obtained by scanning electron microscopy at 6000-time enlargement, of the compound Li$_2$CoPO$_4$F synthesized according to a specific embodiment of the invention.

FIG. 5 shows the morphology of the compound $Li_2CoPO_4F$.

EXAMPLE 2

0.3233 g of cobalt and sodium phosphate, $NaCoPO_4$, are mixed with 0.0767 g of sodium fluoride, NaF. Both powders are mixed manually in an agate mortar for 20 minutes. This mixture of precursors 1 is submitted to a method of synthesis identical to that described in example 1 except that the final temperature is 680° C. with a first temperature ramp at a rate of 100° $C.min^{-1}$ for 5 minutes and a second temperature ramp at a rate of 50° $C.min^{-1}$ for 3 min 40. It is obtained a homogeneous powder of $Na_2CoPO_4F$ with a weight purity of 94% and a yield of 90%.

Figure 6:
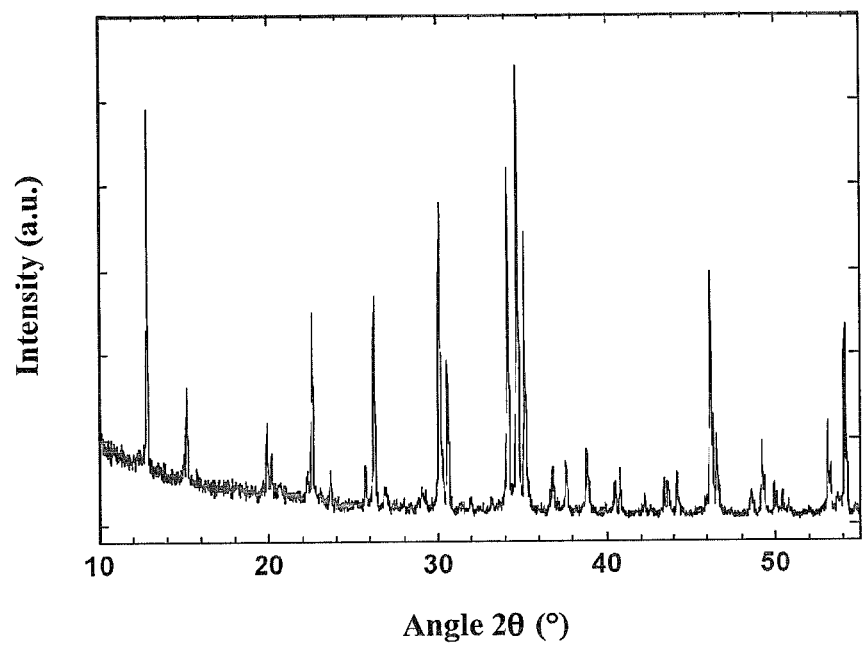
FIG. 6 is a graph representing the x-ray-diffraction diagram ($\lambda_{Cu}K_\alpha$) of a mixed cobalt and sodium fluorophosphate having the formula Na$_2$CoPO$_4$F and synthesized according to a specific embodiment of the invention.
Figure 7:
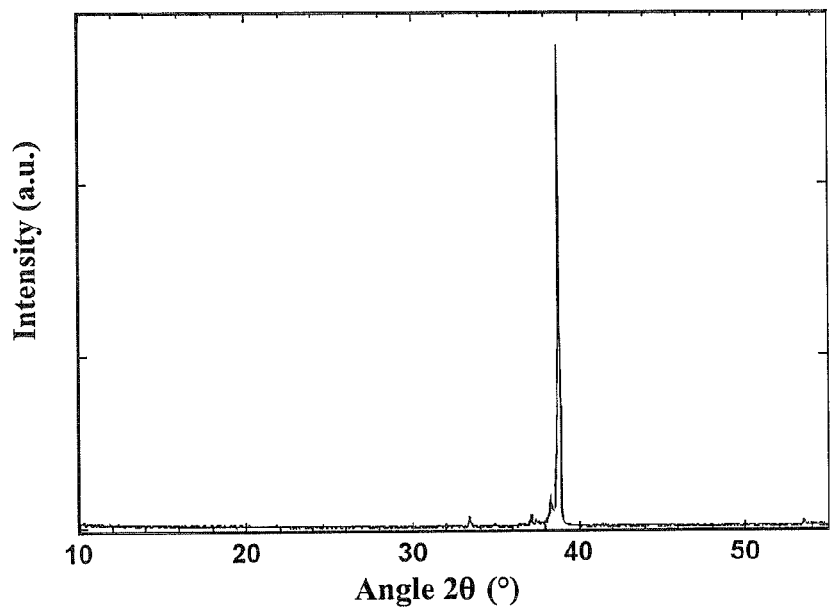
FIGS. 7 and 8 are graphs representing the x-ray-diffraction diagrams ($\lambda_{Cu}K_\alpha$) for sodium fluoride (NaF) and for mixed cobalt and lithium phosphate having the formula NaCoPO$_4$, respectively.
Figure 8:
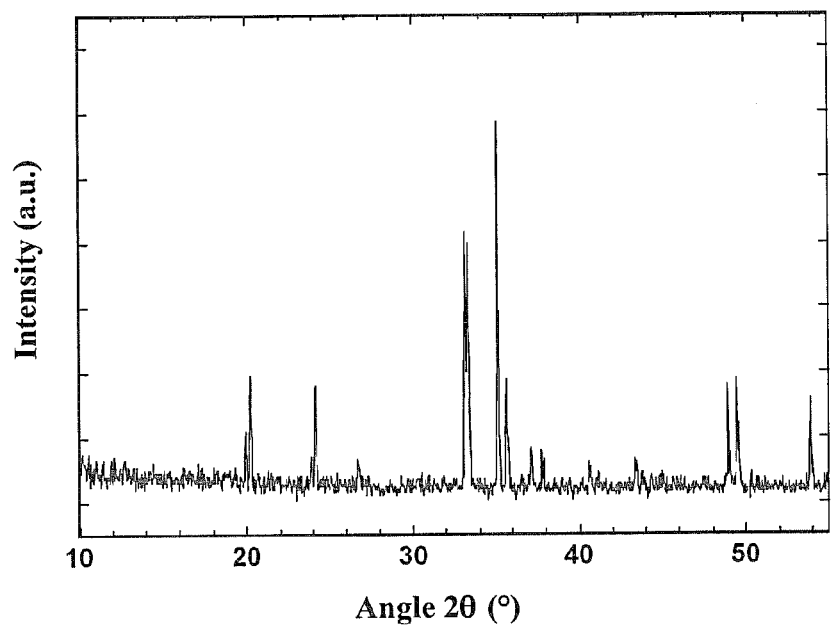

The x-ray diffractogram of the powder thus obtained is shown in FIG. 6. As in example 1, by comparing the peaks of diffraction characteristic of said powder to those of sodium fluoride (FIG. 7) and of sodium and cobalt phosphate (FIG. 8), it is noted that the product resulting from the method of synthesis has a molecular structure different from that of the precursors and corresponds to the sodium and cobalt fluorophosphate, $Na_2CoPO_4F$.

Figure 9:
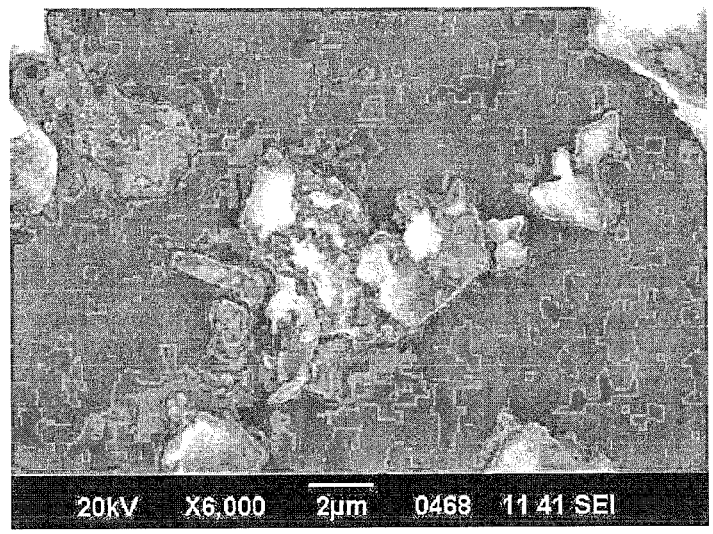
FIG. 9 represents a photo, obtained by scanning electron microscopy at 6000-time enlargement, of a compound Na$_2$CoPO$_4$F synthesized according to a specific embodiment of the invention.

FIG. 9 has the morphology of the grains of $Na_2CoPO_4F$.

The method of synthesis makes it possible to obtain a powder with a pure and homogeneous composition, with very little or no material losses. 'Pure and homogeneous composition' means a powder having a metal fluorophosphate as main ingredient, with possibly a negligible quantity of impurities, i.e lower than 10% in weight, preferably lower than or equal to 5% in weight.

Indeed, the method of synthesis of metal fluorophosphate can include various steps having very short lengths of time, in particular the electric-field-activated sintering step during which the synthesis reaction occurs. Thus, the losses of precursors are limited, in particular for the second fluorine-containing precursor which is generally a volatile compound.

The metal fluorophosphates obtained by the method of synthesis according to the invention can be used as active material for a battery electrode, in particular for lithium or sodium batteries, in particular as active material for a positive electrode. More particularly, the positive electrode of a lithium or sodium battery can be in the form of an intimate dispersion containing the metal fluorophosphate compound synthesized according to the invention, an electroconductive additive and possibly an organic binder. Such a dispersion is generally deposited on a metal sheet used as current collector. The electroconductive additive can be carbon (fibers, nanotubes, tablets, spherical particles, . . . ) and the organic binder, intended to bring a good ionic conduction and a satisfactory mechanical behavior, can for example consist of a polymer chosen among polymers containing methyl methacrylate, acrylonitrile, vinylidene fluoride, as well as polyethers or polyesters.

As an illustration, a lithium battery of the Li-Ion type in the format of a "button cell" has been produced and tested (FIGS. 10 and 11) by employing, as active material for the positive electrode, the compound $Li_2CoPO_4F$ synthesized according to the example 1.

Such a battery thus contains:
a negative electrode constituted of a lithium disc with a diameter of 16 mm and a thickness of 130 µm, which is deposited on a disc of stainless steel 316L used as current collector,
a positive electrode constituted of a disc with a diameter of 14 mm and a thickness of 25 µm including the material of the invention prepared according to the above-mentioned example 1 (80% in mass), black carbon (10% in mass) and polyvinylidene hexafluoride (10% in mass) as a binder, the positive electrode being deposited on a aluminum current collector with a thickness of 20 µm,
a separator soaked with a liquid electrolyte containing $LiPF_6$ salt (1 $mol.l^{-1}$) in solution in a mixture of propylene carbonate and dimethyl carbonate.

Figure 10:
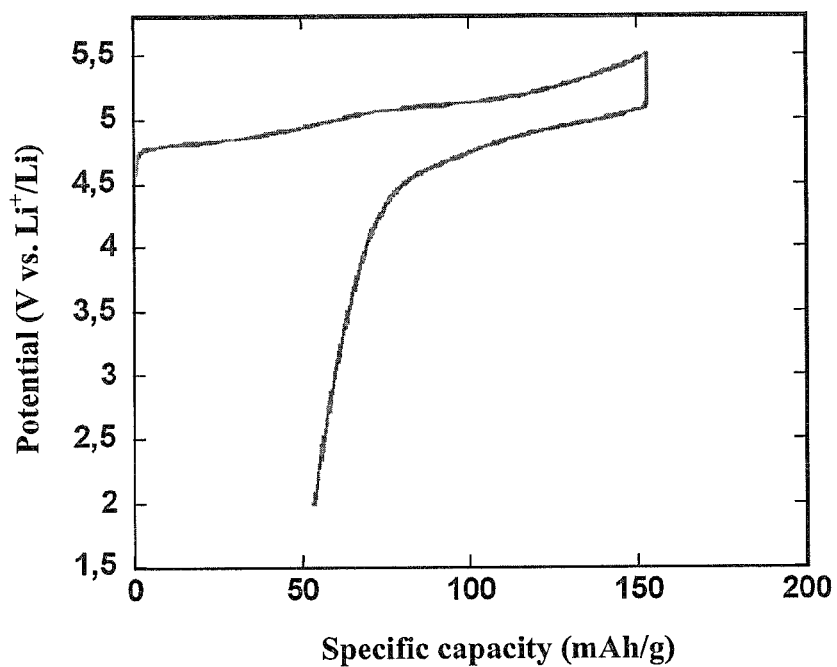
FIG. 10 represents the charge/discharge curves in intentiostatic mode, at a C/10 rate, at 20° C., of a lithium battery of the Li-Ion type containing a mixed metal cobalt and lithium fluorophosphate (Li$_2$CoPO$_4$F) synthesized according to a specific embodiment of the invention.

FIG. 10 represents the curve corresponding to the first charge/discharge cycle of the above-described lithium battery, at 20° C., at a C/10 rate.

Figure 11:
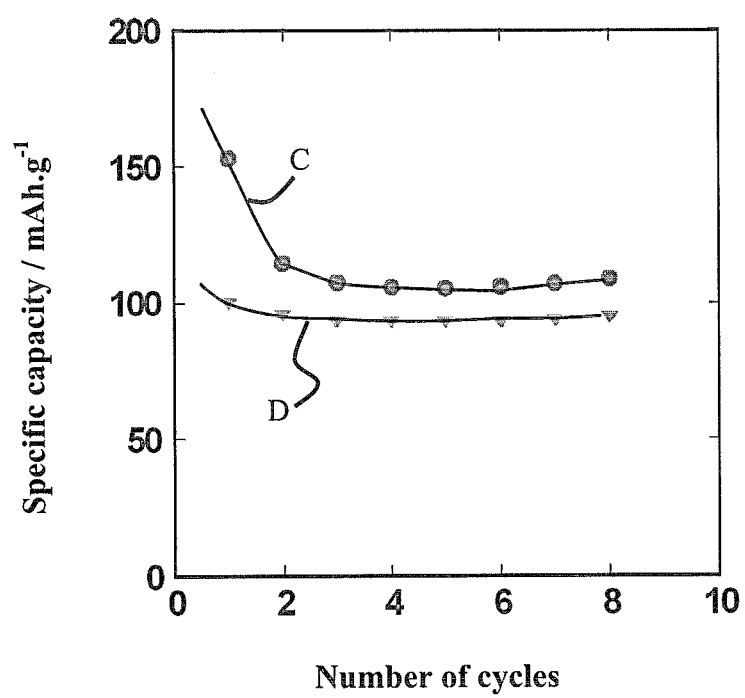
FIG. 11 represents the evolution of the specific charge capacity (C) and specific discharge capacity (D) curves according to the number of cycles carried out in the case of a battery according to FIG. 10.

FIG. 11 represents the evolution of the specific charge capacity (Curve C) and the specific discharge capacity (Curve D) curves of the battery according to the number of cycles carried out. The course of the curves C and D shows that after two cycles, the restored specific discharge capacity is close to the delivered specific charge capacity. Moreover, beyond 8 cycles, the specific charge and discharge capacities remain higher than 100 $mAh \cdot g^{-1}$. Lastly, the value of the specific charge capacity after one cycle is about 150 $mAh \cdot g^{-1}$. The results illustrated in FIGS. 10 and 11, highlight the possibility of reversibly extracting a large quantity of lithium ions present in the positive electrode material.

Moreover, the electrochemical characteristics of the compound of the invention are advantageous compared to the former art, mainly in terms of operating voltage and restored specific discharge capacity, with a theoretical capacity of 287 $mAh \cdot g^{-1}$ and an operating voltage of 5 V vs $Li^+/Li$ ($Li_2CO^{2+}PO_4F \leftrightarrows CO^{4+}PO_4F$).

The method of synthesis makes it possible to obtain a metal fluorophosphate having improved electrochemical performance, so that it can be efficiently used as active material for a battery electrode, in particular for a lithium or sodium battery. Such a method is, in addition, simple to implement and makes it possible to quickly obtain, in less than one hour, advantageously, in less than 30 minutes, various metal fluorophosphate compounds, with a high yield. The electric-field-activated sintering process is used, within the framework of the invention, for the synthesis of metal fluorophosphates and not, according to a usual application of the electric-field-activated sintering technique, for the consolidation or the densification of powders.

The synthesis rate, unusually short for a material for battery electrode, makes it possible to consider a production of metal fluorophosphate on an industrial scale.

The invention claimed is:

1. Method of synthesis of a metal fluorophosphate having the following general formula (1):

$$X_a M_b (PO_4)_c F_d \quad (1)$$

in which:
- X is an alkaline metal selected among sodium (Na) and lithium (Li) or a mixture of said metals;
- M is a transition metal selected among the following elements: Co, Ni, Fe, Mn, V, Cu, Ti, Al, Cr, Mo, Nb or a combination of at least two of said metals,
- $0 \leq a \leq 5$; $0.5 \leq b \leq 3$; $0.5 \leq c \leq 3$; and
- d is an integer equal to 1, 2 or 3, X, M, $PO_4$, F, a, b, c, d being chosen in order to maintain the electroneutrality of the metal fluorophosphate, wherein said method includes a heat treatment of a mixture of solid precursors (1) of said metal fluorophosphate, formed by at least one first phosphate-containing precursor and at least one second fluorine-containing precursor and in that the heat treatment is an electric-field-activated sintering process during which it is applied to said mixture, simultaneously, a pressure between 0.5 MPa and 200 MPa and an electrical current heating said mixture with a mean temperature rising rate between 50° C/min$^{-1}$ and 600° C/min$^{-1}$.

2. Method according to claim 1, wherein in that the mixture of precursors (1) is submitted to a pulsated current with an intensity between 100 A and 50000 A.

3. Method according to claim 2, wherein the pulsated current has an intensity between 300 A and 2000 A.

4. Method according claim 1, wherein the pressure is between 10 MPa and 50 MPa.

5. Method according to claim 1, wherein the electric-field-activated sintering process for the mixture of precursors (1) successively includes:
- a rise in pressure up to a pressure between 0.5 MPa and 200 MPa, said pressure being reached in less than 600 seconds, and
- a rise in temperature up to a temperature between 300° C. and 1000° C., the temperature being reached in less than 20 minutes and said pressure being maintained all along the rise in temperature.

6. Method according to claim 5, wherein the rise in temperature includes several temperature ramps, each said ramp corresponding to a temperature rising rate between 50° C/min$^{-1}$ and 600° C/min$^{-1}$.

7. Method according to claim 1, wherein the metal fluorophosphate is a metal fluorophosphate having the following general formula (2):

$$X_2 M' PO_4 F \quad (2)$$

in which
- M' is a transition metal selected among Co, Ni, Fe, V, Cu, Ti, Al, Mn, Cr, Mo, Nb, and
- X is an alkaline metal selected among Na and Li or a mixture of said metals.

8. Method according to claim 7, wherein the metal fluorophosphate is a mixed cobalt metal fluorophosphate.

9. Method according to claim 1, wherein the first phosphate-containing precursor is selected among a metal phosphate, a sodium phosphate and an ammonium phosphate.

10. Method according to claim 9, wherein the metal phosphate is selected among $VPO_4$, $AlPO_4$, $FePO_4$, $MnPO_4$, $TiPO_4$, $CrPO_4$, $Co_3(PO_4)_2$, $Li_3PO_4$, $LiFePO_4$, $LiCoPO_4$, $NaCoPO_4$, $LiMnPO_4$, $LiNiPO_4$, $LiVPO_4$, $LiTi_2(PO_4)_3$, $Li_2TiFe(PO_4)_3$, $Na_2Ti_2(PO_4)_3$, $Na_2TiFe(PO_4)_3$, $Na_3V_2(PO_4)_3$, $Li_3V_2(PO_4)_3$, $Li_3Cr_2(PO_4)_3$, $Na_3Cr_2(PO_4)_3$, and their hydrates.

11. Method according to claim 9, wherein the ammonium phosphate is selected among $NH_4H_2PO_4$, $(NH_4)_2HPO_4$, $NaNH_4HPO_4$ and their hydrates.

12. Method according to claim 1, wherein the second fluorine-containing precursor is a metal fluoride selected among NaF, LiF, $NH_4F$, $MnF_2$, $CoF_2$, $NiF_2$, $TiF_2$, $FeF_2$, hydrated $FeF_2$ and $CrF_3$.

13. Method according to claim 1, wherein the mixture of precursors (1) contains a third precursor selected among a metallic oxide, a metal hydroxide, a metal acetate, a metal carbonate, a metal nitrate, a metal sulfate, a metal oxalate and a metal oxohydroxide.

14. Method according to claim 13, wherein the third precursor is selected among FeO, MnO, NiO, CoO, $MnO_2$, $Li_2CO_3$, $TiO_2$, $Cr_2O_3$, $V_2O_3$, $V_2O_5$, $Fe_2O_3$, $Mn_2O_3$, $Fe_3O_4$, $Mn_3O_4$, $Ni_3O_4$, $Co_3O_4$, $Al(OH)_3$, $Al_2O_3$, $Na_2CO_3$, $FeC_2O_5$, $NH_4VO_3$, $Cr(NO_3)_3$, $P_2O_5$ and their hydrates.

15. Method according to claim 1, wherein the method includes a preliminary synthesis step for the metal phosphate from at least one ammonium or sodium phosphate and at least one metallic oxide, one metal hydroxide or one metal carbonate, said ammonium phosphate being selected among $NH_4H_2PO_4$, $(NH_4)_2HPO_4$, $NaNH_4HPO_4$ and their hydrates and said sodium phosphate being $NaH_2PO_4$ and its hydrates.

16. Method according to claim 15, wherein the preliminary synthesis step for the metal phosphate is an electric-field-activated sintering process.

* * * * *